(12) United States Patent
Lemaitre et al.

(10) Patent No.: US 11,192,535 B2
(45) Date of Patent: Dec. 7, 2021

(54) HYDRAULIC BRAKE CIRCUIT

(71) Applicant: POCLAIN HYDRAULICS INDUSTRIE, Verberie (FR)

(72) Inventors: Bertrand Lemaitre, Verberie (FR);
Antoine Desmyttere, Verberie (FR);
André Prigent, Verberie (FR); Marko Zust, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 308 days.

(21) Appl. No.: 15/946,037

(22) Filed: Apr. 5, 2018

(65) Prior Publication Data

US 2019/0106093 A1     Apr. 11, 2019

(30) Foreign Application Priority Data

Apr. 7, 2017   (FR) ...................................... 1753050

(51) Int. Cl.
| | |
|---|---|
| *B60T 13/14* | (2006.01) |
| *B60T 7/20* | (2006.01) |
| *B60T 13/66* | (2006.01) |
| *B60T 13/68* | (2006.01) |
| *B60T 13/16* | (2006.01) |

(Continued)

(52) U.S. Cl.
CPC .............. *B60T 13/14* (2013.01); *B60T 7/042* (2013.01); *B60T 7/20* (2013.01); *B60T 8/1701* (2013.01); *B60T 8/171* (2013.01); *B60T 13/16* (2013.01); *B60T 13/662* (2013.01); *B60T 13/686* (2013.01); *B60T 17/221* (2013.01); *B60T 2220/04* (2013.01); *B60T 2270/402* (2013.01); *B60T 2270/403* (2013.01)

(58) Field of Classification Search
CPC . B60T 13/14; B60T 7/042; B60T 7/20; B60T 8/171; B60T 13/16; B60T 13/662; B60T 13/686; B60T 17/221
See application file for complete search history.

(56) References Cited

U.S. PATENT DOCUMENTS 4,861,115 A * 8/1989 Petersen .................. B60T 8/268
303/15
6,206,484 B1 * 3/2001 Ganzel .................... B60T 8/268
188/358

(Continued)

FOREIGN PATENT DOCUMENTS

| EP | 1800983 A1 | 6/2007 |
|---|---|---|
| WO | 2017050632 A1 | 3/2017 |

*Primary Examiner* — Robert A. Siconolfi
*Assistant Examiner* — James K Hsiao
(74) *Attorney, Agent, or Firm* — The Webb Law Firm

(57) ABSTRACT

A driver circuit for driving a brake having a first orifice adapted to be connected to a pressure source, a second orifice connected to a reservoir, a third orifice receiving a braking setpoint, and a fourth orifice connected to a brake. The driver circuit includes a proportional solenoid valve connected to the first orifice; an on/off solenoid valve connected to the third orifice; and a proportional braking valve provided with an actuator and configured in such a manner as to connect a brake selectively to a pressure source or to a reservoir. The actuator is configured in such a manner as to be driven by the higher of the two pressures delivered by the proportional solenoid valve and delivered by the on/off solenoid valve.

20 Claims, 8 Drawing Sheets

(51) Int. Cl.
*B60T 7/04* (2006.01)
*B60T 8/17* (2006.01)
*B60T 8/171* (2006.01)
*B60T 17/22* (2006.01)

(56) References Cited

U.S. PATENT DOCUMENTS

| | | | |
|---|---|---|---|
| 8,696,070 B2 * | 4/2014 | Costaz | B60T 15/36 303/11 |
| 9,061,668 B2 * | 6/2015 | Dabbs | B60T 13/141 |
| 2012/0286563 A1 * | 11/2012 | Lichterfeld | B60T 8/1705 303/15 |
| 2013/0127239 A1 * | 5/2013 | Brenninger | B60T 11/21 303/9.61 |

* cited by examiner

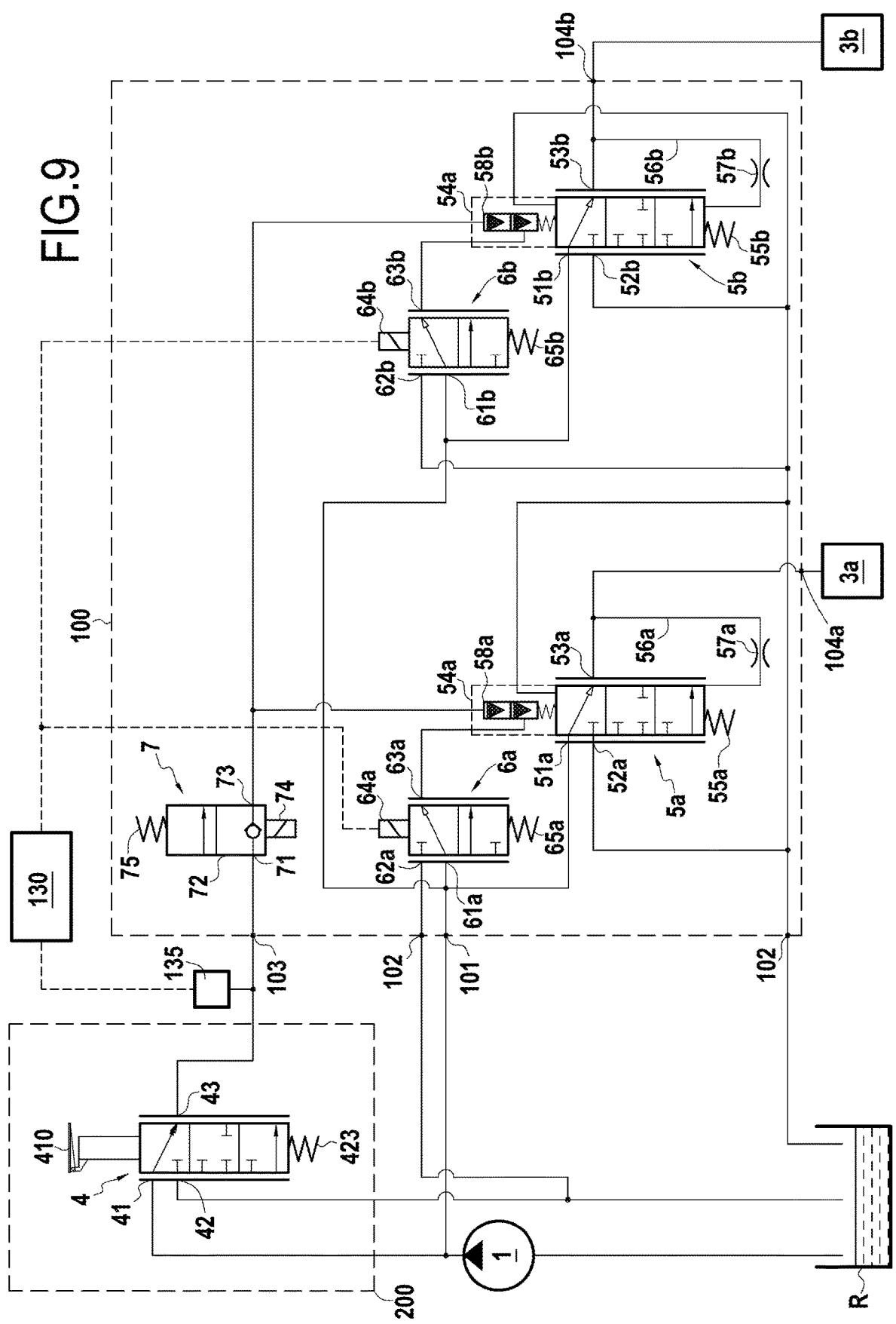

HYDRAULIC BRAKE CIRCUIT

CROSS-REFERENCE TO RELATED APPLICATION

This application claims priority to French Patent Application No. 1753050 filed Apr. 7, 2017, the disclosure of which is hereby incorporated in its entirety by reference.

FIELD OF THE INVENTION

The present invention relates to the field of hydraulic brake circuits, and can be applied for instance to vehicles that have trailers hitched thereto.

STATE OF THE PRIOR ART

Hydraulic brake systems for vehicles that can be provided with a trailer, e.g. tractors, have to enable driving both the vehicle brake and the trailer brake. Driving of the trailer brake should also be distinct from driving of the vehicle brake in order to comply with regulations.

Conventional systems thus make provision to drive the braking action on the trailer via controls that are driven electrically so as to ensure that the braking of the trailer is proportional to the braking of the vehicle. However, in the event of failure of the electrical system, the driver circuit is no longer operational, and the trailer brake is then held either engaged or disengaged.

When the brake is held engaged, it can be understood that the trailer is then necessarily immobilized, thereby making it impossible for the work in progress to be continued, and requiring the trailer to be repaired on site or to be taken away by another vehicle, which is very inconvenient. Conversely, when the trailer brake is held disengaged, it is possible for the work in progress to be continued, but the absence of an operational brake on the trailer is problematic in terms of safety, in particular when the vehicle is travelling at relatively high speed.

SUMMARY OF THE INVENTION

An object of the present specification is thus to propose a response to that problem.

To this end, the present specification proposes a driver circuit for driving a brake, which driver circuit has a first orifice adapted to be connected to a pressure source, a second orifice adapted to be connected to a reservoir, a third orifice adapted to receive a pressure proportional to a braking setpoint, and a fourth orifice adapted to be connected to a brake, said driver circuit including:
  a proportional solenoid valve connected to the first orifice of the driver circuit;
  a solenoid directional two stable positions valve connected to the third orifice of the driver circuit; and
  a proportional braking valve provided with an actuator and configured in such a manner as to connect a brake selectively to a pressure source or to a reservoir;
said driver circuit being characterized in that the actuator is configured in such a manner as to be driven by the higher of the two pressures delivered by the proportional solenoid valve and delivered by the solenoid directional two stable positions valve.

In an example, the actuator comprises a hydraulic control and a high-pressure selector that is configured in such a manner as to connect the proportional solenoid valve or the solenoid directional two stable positions valve to the hydraulic control, the proportional solenoid valve, the solenoid directional two stable positions valve and the selector being configured in such a manner that, in a first configuration, the hydraulic control of the braking valve is connected to the first orifice of the driver circuit via the proportional solenoid valve, and, in a second configuration, the hydraulic control of the braking valve is connected to the third orifice of the driver circuit via the solenoid directional two stable positions valve.

In a variant of such an example, the braking valve typically has a first orifice connected to the first orifice of the driver circuit, a second orifice connected to the second orifice of the driver circuit, and a third orifice connected to the driven brake, the braking valve being driven by resilient return means that are opposed by a hydraulic control, the resilient return means urging the braking valve to be positioned in a configuration in which its first orifice is closed off, and its second orifice is connected to its third orifice, and the selector has a first admission, a second admission and a delivery, said delivery being connected to the hydraulic control of the auxiliary braking valve, the selector being configured in such a manner as to connect the admission that has the higher pressure to the delivery, the proportional solenoid valve having a first orifice connected to the first orifice of the driver circuit, a second orifice connected to the second orifice of the driver circuit, and a third orifice connected to the first admission of the selector, the proportional solenoid valve being driven by resilient return means that are opposed by a hydraulic control, the resilient return means urging the proportional solenoid valve to be positioned in a configuration in which its first orifice is closed off, and its second orifice is connected to its third orifice, and the solenoid directional two stable positions valve having a first orifice connected to the third orifice of the driver circuit, a second orifice connected to the second orifice of the driver circuit, and a third orifice connected to the second admission of the selector, the solenoid directional two stable positions valve being driven by resilient return means that are opposed by a hydraulic control, the resilient return means urging the solenoid directional two stable positions valve to be positioned in a configuration in which its second orifice is closed off, and its first orifice is connected to its third orifice.

In an example, the actuator includes a first piston associated with a first chamber connected to the solenoid directional two stable positions valve, and a second piston associated with a second chamber connected to the proportional solenoid valve, so that the auxiliary braking valve is driven by the higher of the two pressures constituted by the pressure inside the first chamber and by the pressure inside the second chamber.

In optional manner, the circuit further includes a pressure reducer configured in such a manner as to limit the pressure applied by the pressure source to the actuator of the braking valve via the third orifice of the driver circuit.

Said pressure reducer is then typically calibrated to 25 bars.

In an example, the driver circuit further includes a calibrated check valve connecting the actuator of the braking valve to the second orifice of the driver circuit, said calibrated check valve being configured in such a manner as to allow fluid to pass through from the actuator of the braking valve to the second orifice of the driver circuit when the pressure applied to the actuator of the braking valve exceeds a drive threshold value.

Said drive threshold value is then typically equal to 30 bars.

In an example, the braking valve is configured in such a manner as to deliver an outlet pressure via its third orifice, which pressure is amplified by an outlet ratio relative to the drive pressure applied to the actuator.

Said outlet ratio then typically lies in the range 4 to 9.

In an example, the third orifice of the driver circuit is adapted to receive a pressure that is proportional to the pressure applied to the vehicle main brake.

The present specification also provides a vehicle including:
- a control circuit as defined above;
- a pressure source connected to the first orifice of the driver circuit;
- a reservoir connected to the second orifice of the driver circuit;
- a brake connected to the fourth orifice of the driver circuit; and
- a control circuit configured in such a manner as to deliver a pressure that is proportional to a braking setpoint to the third orifice of the driver circuit.

In an example, the control circuit includes:
- a main brake; and
- a proportional first braking valve that drives the main brake, that is connected to the pressure source, to the third orifice of the driver circuit and to the main brake, and that is configured in such a manner as to deliver a pressure that is proportional to a mechanical control to the third orifice of the driver circuit and to the main brake.

Said vehicle then typically further includes a computer configured in such a manner as to control the proportional solenoid valve as a function of the pressure delivered to the main brake by the first braking valve, in particular by means of a pressure sensor.

The present specification also provides a vehicle including:
- a control circuit as defined above;
- a first pressure source and a second pressure source, said second pressure source being connected to the first orifice of the driver circuit;
- a first reservoir and a second reservoir, the second reservoir being connected to the second orifice of the driver circuit;
- a brake connected to the fourth orifice of the driver circuit; and
- a control circuit configured in such a manner as to modulate the pressure coming from the first pressure source and to deliver said pressure to the main brake, and to deliver a pressure that is proportional to a braking setpoint to the third orifice of the driver circuit;
- a proportional driving valve connected to the second pressure source, to the second reservoir and to the third orifice of the driver circuit, and including a hydraulic control connected to the main brake, in such a manner that the pressure delivered to the third orifice by the second pressure source via the driving valve is proportional to the pressure delivered to the main brake by the first pressure source.

BRIEF DESCRIPTION OF THE DRAWINGS

The invention and its advantages can be better understood on reading the following detailed description of different embodiments of the invention that are given by way of non-limiting example. This description refers to the accompanying sheets of figures, in which:

FIG. 9 shows another variant of a driver circuit of the present specification.

In all of the figures, like elements have like numerical references.

DESCRIPTION OF THE INVENTION

Figure 1:
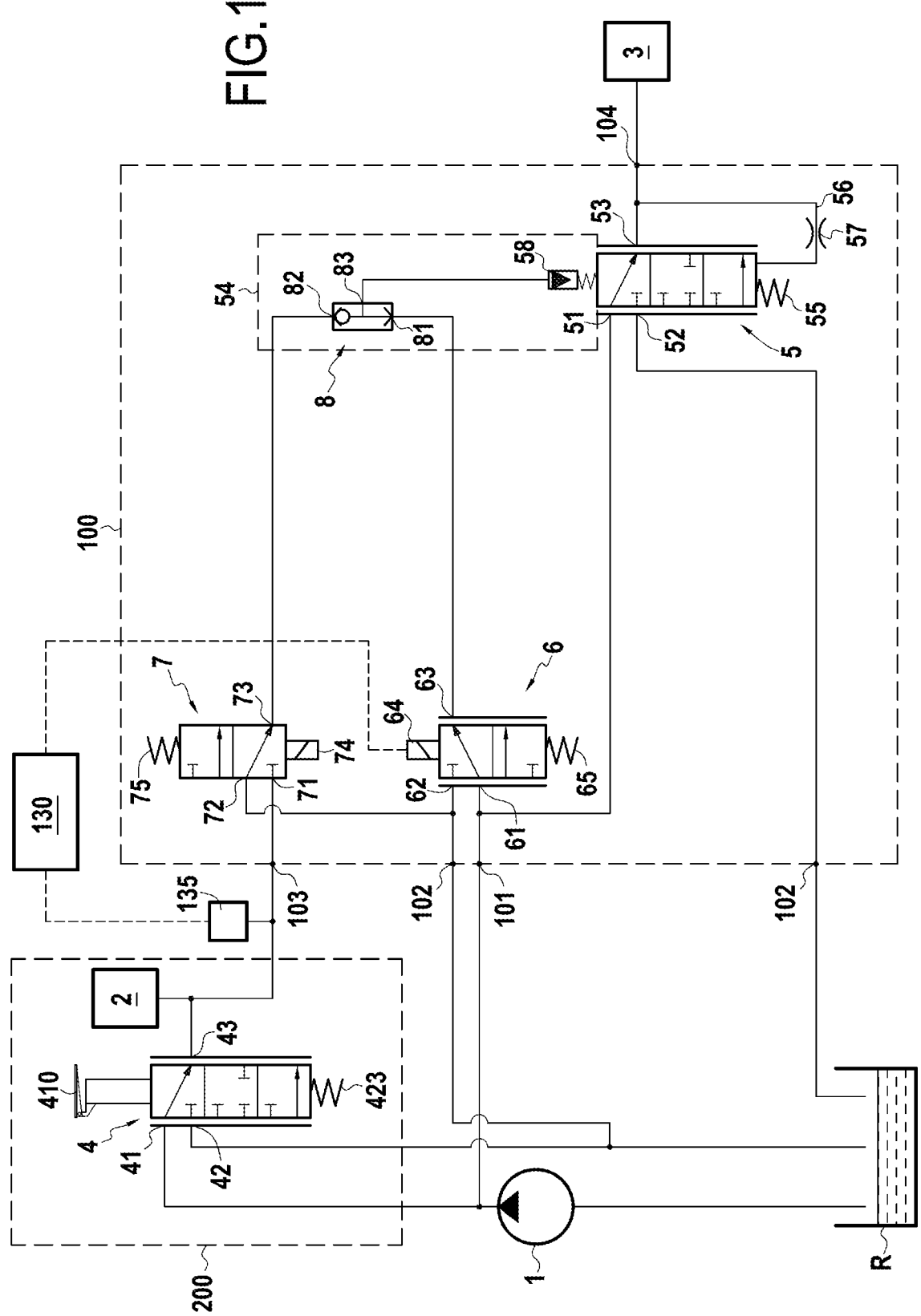
FIG. 1 is a diagram showing a hydraulic brake circuit including a driver circuit in an aspect of the invention and in a first configuration.

FIG. 1 is a diagram showing a hydraulic brake circuit in an aspect of the invention and in a first configuration corresponding to "normal" operation, i.e. operation in which there is no failure, and in particular no electrical failure.

The brake circuit as shown includes a pressure source 1, a control circuit 200 including a main brake 2, and a driven brake 3. The driven brake 3 may comprise one or more brakes of a vehicle or of a trailer.

The pressure source 1 is shown diagrammatically as a hydraulic pump drawing fluid from a reservoir R that is typically at ambient pressure, but said pressure source 1 may be constituted by any suitable means, in particular by one or more hydraulic pumps, or by one or more hydraulic accumulators optionally coupled to one or more hydraulic pumps. In the present specification, the general reference R designates a reservoir to which various different elements are connected, it being understood that it may be constituted by a single reservoir or by a plurality of distinct reservoirs.

The main brake 2 is typically the brake of a vehicle adapted to tow a trailer, such a vehicle being, for example, a tractor. The main brake 2 is typically a pressure-braking dynamic brake that exerts a braking force that is a function of the pressure that is applied to it, e.g. in a braking chamber, and the higher the pressure, the higher the braking force. As explained below, the main brake 2 is an element of the control circuit 200, the control circuit 200 being configured in such a manner as to deliver a braking setpoint. The embodiment shown that includes the main brake 2 is thus merely a non-limiting example of the proposed circuit.

The driven brake 3 is typically the brake of a trailer associated with the vehicle incorporating the brake circuit. The driven brake 3 is typically a pressure-braking dynamic brake that exerts a braking force that is a function of the pressure that is applied to it, e.g. in a braking chamber, and the higher the pressure, the higher the braking force. The driven brake 3 may comprise a plurality of brakes, e.g. two brakes on a trailer, the brakes respectively acting on distinct wheels or on distinct axles.

In order to drive the braking of the main brake 2, the control circuit 200 includes a proportional first braking valve 4 connecting the main brake to the pressure source 1. More generally, the control circuit 200 makes it possible to deliver a pressure that is proportional to a braking setpoint.

Figure 2:
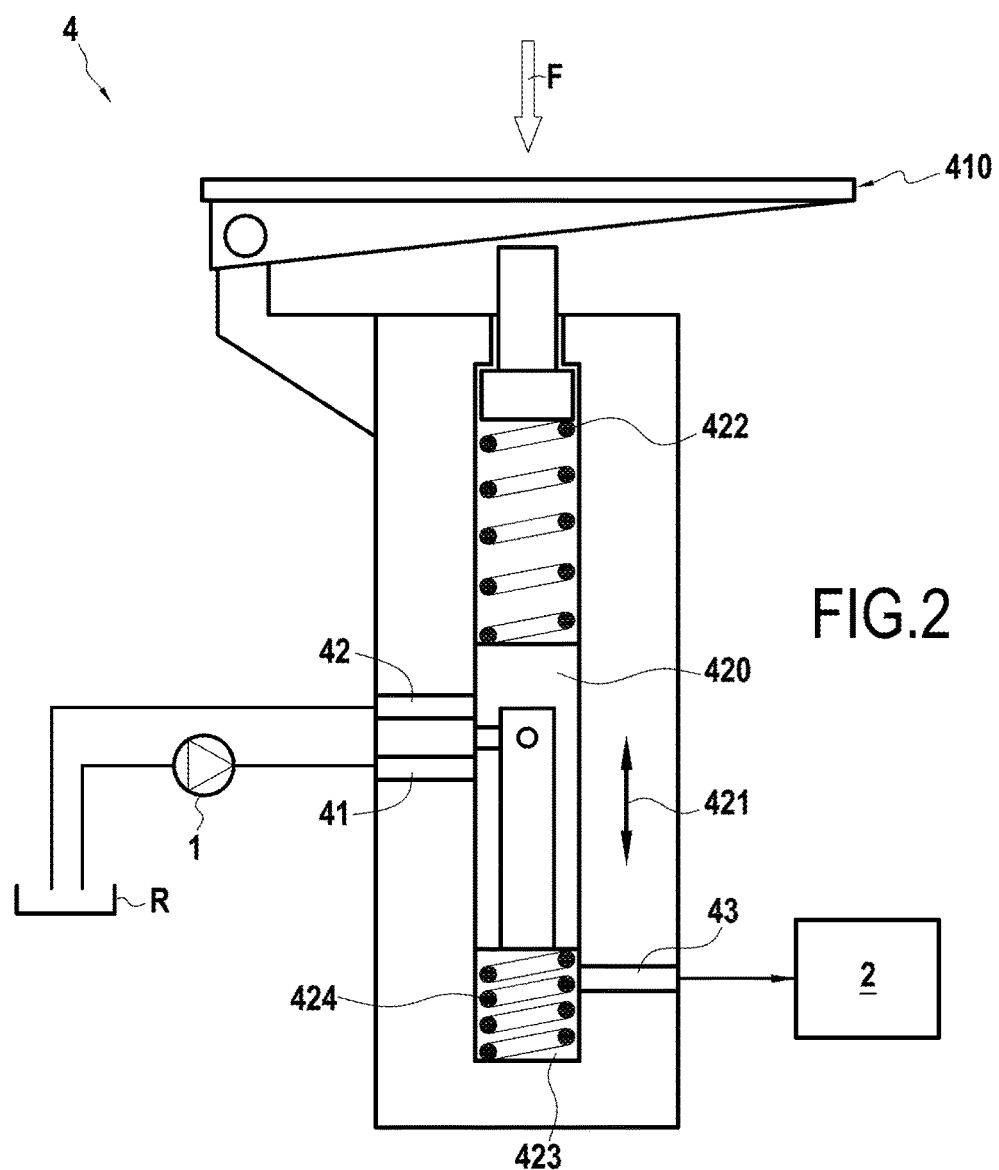
FIG. 2 shows an example of a structure for the proportional first braking valve shown in FIG. 1.

FIG. 2 shows an embodiment of said first braking valve 4.

The first braking valve 4 has:
a first orifice 41 connected to the pressure source 1;
a second orifice 42 connected to the reservoir R; and
a third orifice 43 connected to the main brake 2, typically to a chamber of the main brake 2 such as a braking or brake-releasing chamber, said third orifice 43 forming an outlet orifice of the first braking valve 4.

As can be seen in FIG. 2, the first braking valve 4 includes a plunger or slide 420 mounted to move in translation in a cylinder 421 in such a manner as to put the third orifice 43 into communication selectively with the first orifice 41 or with the second orifice 42 as a function of the degree of actuation of a progressive mechanical control 410, e.g. a brake pedal. The action of a user on the mechanical control 410, which is a brake pedal in this example, is shown diagrammatically by an arrow F.

The first braking valve 4 includes a loading spring 422 that is compressed by actuation of the mechanical control 410, tending to move the plunger 420 so as to put the first orifice 41 into communication with the third orifice 43.

The first braking valve 4 also includes a feedback chamber 423 including a spring 424, the spring 424 and the feedback chamber 423 being positioned at the end of the plunger 420 that is opposite from the end at which the loading spring 422 is situated, so as to exert thrust opposing the thrust of the loading spring.

Thus, in the absence of actuation of the mechanical control 410, the spring 424 exerts thrust on the plunger 420 that puts the second orifice 42 into communication with the third orifice 43, and thus connects the main brake 2 to the reservoir R.

When the mechanical control 410 is actuated, the spring 422 increases its thrust on the plunger 420 so as to put the first orifice 41 into communication with the third orifice 43, thereby applying a pressure on the main brake 2, making it possible to brake. In parallel, the pressure also increases in the feedback chamber 423.

The pressure in the feedback chamber 423 exerts thrust on the plunger 420 that opposes the thrust from the loading spring 422 resulting from actuation of the main brake 2, and that tends to reduce the flow rate flowing from the first orifice 41 to the third orifice 43.

When equilibrium exists between the thrust from the loading string 422 and the thrust exerted by the pressure of fluid in the feedback chamber 423, the plunger 420 is held in equilibrium and maintains the pressure at the third orifice 43 (and thus the pressure applied to the main brake 2) at a constant value proportional to the force exerted by the mechanical control 410.

The equilibrium depends on the geometrical characteristics of the first braking valve 4 (plunger and cylinder) and on the calibration of the loading spring 422. Thus, the first braking valve 4 delivers a pressure via its third orifice 43 that is proportional to a degree of actuation of the mechanical control 410, the coefficient of proportionality depending on the characteristics of the first braking valve 4. The association of the pressure source 1 and of the first braking valve thus makes it possible to implement a pressure source that delivers to the main brake 2 a pressure that is modulated by a control, and in this example that is proportional to the mechanical control 410.

By way of a variant, the first braking valve 4 may be a master cylinder or any other known brake control. More generally, the control circuit is configured to deliver a pressure that is proportional to a braking setpoint. In the example shown, the main brake 2 is connected to a pressure source that is configured to deliver a pressure that is proportional to a control.

With reference to FIG. 1, the brake circuit as presented includes a driver circuit 100 for driving the driven brake 3 and configured in such a manner as to drive engagement of said driven brake selectively.

The driver circuit 100 has a first orifice 101 connected to the pressure source 1, a second orifice 102 connected to the reservoir R, a third orifice 103 connected to the proportional braking valve 4 of the main brake 2, and a fourth orifice 104 connected to the driven brake 3. The pressure delivered to the third orifice 103 of the driver circuit 100 is thus driven via the first braking valve 4, and is typically proportional to or equal to the pressure delivered by the first braking valve 4 to the main brake 2. More generally, the third orifice 103 of the driver circuit 100 is adapted to receive a pressure that is proportional to the pressure applied to the main brake 2. More generally, the third orifice 103 receives a pressure that is proportional to a braking setpoint that may or may not be linked to a setpoint applied to a main brake 2.

The driver circuit 100 is typically in the form of a box, or in the form of different elements associated with one another and interconnected via hydraulic ducts. It can be understood that some of the above-mentioned orifices may be duplicated, and in particular the second orifice 102 connected to the reservoir R may be duplicated as a function of the structures of the components used, as shown in the figures. Depending on the structure chosen for the driver circuit 100, the orifices 101, 102, 103, and 104 may be formed in a driver circuit box, or else be formed directly by the orifices of the valves and solenoid valves that are described below.

The driver circuit 100 as shown in FIG. 1 includes a braking valve 5, a proportional solenoid valve 6, and a solenoid directional two stable positions valve 7.

The braking valve 5 is a proportional valve that is driven by a hydraulic control.

The braking valve 5 operates similarly to the first braking valve 4, as described with reference to FIG. 1, only the driving of this braking valve 5 being distinct, and, in this example, being constituted by a hydraulic control instead of the mechanical control 410 of the first braking valve 4. The braking valve 5 has a first orifice 51 connected to the pressure source 1 via the first orifice 101 of the driver circuit 100, a second orifice 52 connected to the reservoir R via the second orifice 101 of the driver circuit 100, and a third orifice 53 connected to the driven brake 3 via the fourth orifice 104 of the driver circuit 104, typically to a chamber of the driven brake 3 such as a braking or brake-releasing chamber. The braking valve 5 is driven by a hydraulic control 54 that is opposed by return means 55, such as a spring, and the braking valve 5 also has a branch-back line 56 that implements a return loop function making it possible to reach an equilibrium point when the desired pressure is delivered at the third orifice 53 of the braking valve 5 (and thus at the fourth orifice 104 of the driver circuit 100). The branch-back line 56 is typically provided with a flow limiter 57 or constriction, and applies a pressure equal to the pressure at the third orifice 53 in the braking valve 5, in opposition to the action of the hydraulic control 54. Preferably, the braking valve 5 is typically configured in such a manner as to deliver an outlet pressure (i.e. at its third outlet 53, and thus at the fourth orifice 104 of the driver circuit 100) that is amplified by an outlet ratio relative to the drive pressure applied by the hydraulic control 54. By way of example, this outlet ratio typically lies in the range 4 to 9, or indeed is equal to 5, so that the pressure at the third orifice 53 is equal to 5 times the drive pressure applied to the hydraulic control 54.

The braking valve 5 is, by default (i.e. in the absence of application of a pressure via the hydraulic control 54), in a configuration in which the first orifice 51 is closed off, and the second orifice 52 is connected to the third orifice 53. The hydraulic control 54 applying a pressure causes the braking valve 5 to switch over to a configuration in which the first orifice 51 is connected to the third orifice 53, and the second orifice 52 is closed off, proportionally to the pressure applied by the hydraulic control 54, so that the pressure at the third orifice 53 is proportional to the pressure applied via the hydraulic control 54. It is this configuration that is shown in the figures.

In the embodiment shown, the hydraulic control 54 comprises a high-pressure selector 8 and a hydraulic actuator 58.

The high-pressure selector 8 has a first admission 81, a second admission 82 and a delivery 83, and is configured in such a manner as to connect the delivery 83 to the admission having the higher pressure, chosen from the first admission 81 and the second admission 82.

The proportional solenoid valve 6 has a first orifice 61 connected to the pressure source 1 via the first orifice 101 of the driver circuit 100, a second orifice 62 connected to the reservoir R via the second orifice 101 of the driver circuit 100, and a third orifice 63 connected to the first admission 81 of the high-pressure selector 8.

The proportional solenoid valve 6 is driven via an electrical control 64 that is opposed by return means 65. The proportional solenoid valve 6 is, by default (i.e. in the absence of application of a control via the electrical control 64), in a first configuration in which the first orifice 61 is closed off, and the second orifice 62 is connected to the third orifice 63. Application of a control by the electrical control 64 causes a proportional switch-over to the second configuration, in which the first orifice 61 is connected to the third orifice 63, and the second orifice 62 is closed off, in such a manner that the pressure at the third orifice 63 is proportional to the control applied.

In the embodiment shown, the first orifice 61 of the proportional solenoid valve 6 and the first orifice 51 of the braking valve 5 are both connected to the first orifice 101 of the driver circuit 100, the hydraulic duct connected to the first orifice 101 thus branching off inside the driver circuit 100. It can be well understood that a driver circuit operating in a similar manner may be implemented by connecting the first orifice 61 of the proportional solenoid valve 6 and the first orifice 51 of the braking valve 5 to the pressure source 1, each via distinct orifices of the driver circuit 100. The orifice 101 is then duplicated, the branch-off being implemented outside the driver circuit 100.

The solenoid directional two stable positions valve 7 has a first orifice 71 connected to the third orifice 43 of the first braking valve 4, a second orifice 72 connected to the reservoir R via the second orifice 101 of the driver circuit 100, and a third orifice 73 connected to the second admission 82 of the high-pressure selector 8.

The solenoid directional two stable positions valve 7 has two configurations: a first configuration in which the first orifice 71 is connected to the third orifice 73 and the second orifice 72 is closed off, and a second configuration in which the first orifice 71 is closed off and the second orifice 72 is connected to the third orifice 73. The solenoid directional two stable positions valve 7 is driven via an electrical control 74 that is opposed by return means 75 such as a spring. By default (i.e. in the absence of control applied by the control 74), the return means 75 maintain it in the first configuration. Actuation of the control 74 makes it possible to cause the solenoid directional two stable positions valve 7 to switch over from the first configuration to the second configuration. This switch-over is of the on/off type, i.e. application of a control via the control 74 switches over the solenoid directional two stable positions valve 7 directly to the second configuration, unlike what happens with a proportional valve.

The high-pressure selector 8 thus connects the hydraulic actuator 58 of the braking valve 5 to the orifice, chosen between the third orifice 63 of the proportional solenoid valve 6 and the third orifice 73 of the solenoid directional two stable positions valve 7, that is at the higher pressure, that pressure thus being the pressure applied by the hydraulic actuator 58. More generally, the hydraulic control 54 thus drives the pressure of the braking valve 5 by means of the higher pressure from between the pressure delivered by the proportional solenoid valve 6 and the pressure delivered by the solenoid directional two stable positions valve 7.

The driver circuit 100 may be incorporated entirely into a vehicle such as a tractor, or else be distributed between the vehicle and the associated trailer. By way of example, when the driver circuit 100 is distributed between the vehicle and the associated trailer, the braking valve 5 may be mounted on the trailer, while the other elements of the driver circuit are mounted on the vehicle. When the driver circuit 100 is mounted on the vehicle, said vehicle is provided with a hydraulic coupling corresponding to the third orifice 53 of the braking valve 5, thereby enabling it to be connected to a trailer driven brake 3. For example, the driver circuit 100 may then be in the form of a module that can be incorporated into the vehicle, or else can be retrofitted thereto in addition to the existing hydraulic system.

A "normal" operating mode is described below with reference to FIG. 1. The term "normal" operating mode is used to mean a mode in which the various components do not fail.

In this embodiment, the pressure source 1 is operating, and the user actuates the mechanical control 410 to drive the main brake 2 of the vehicle via the first braking valve 4.

The braking valve 5 is driven in such a manner as to control the driven brake 3. As described above, the hydraulic actuator 58 is connected either to the third orifice 63 of the proportional solenoid valve 6 or to the third orifice 73 of the solenoid directional two stable positions valve 7. The solenoid directional two stable positions valve 7 is switched over to the second configuration by the electrically actuated control 74, so that the second admission 82 of the high-pressure selector 8 is connected to the reservoir R. The proportional solenoid valve 6 is driven via the electrical control 64 in such a manner as to deliver a pressure via its third orifice 63 that is proportional to an electrical control 64.

Figure 5:
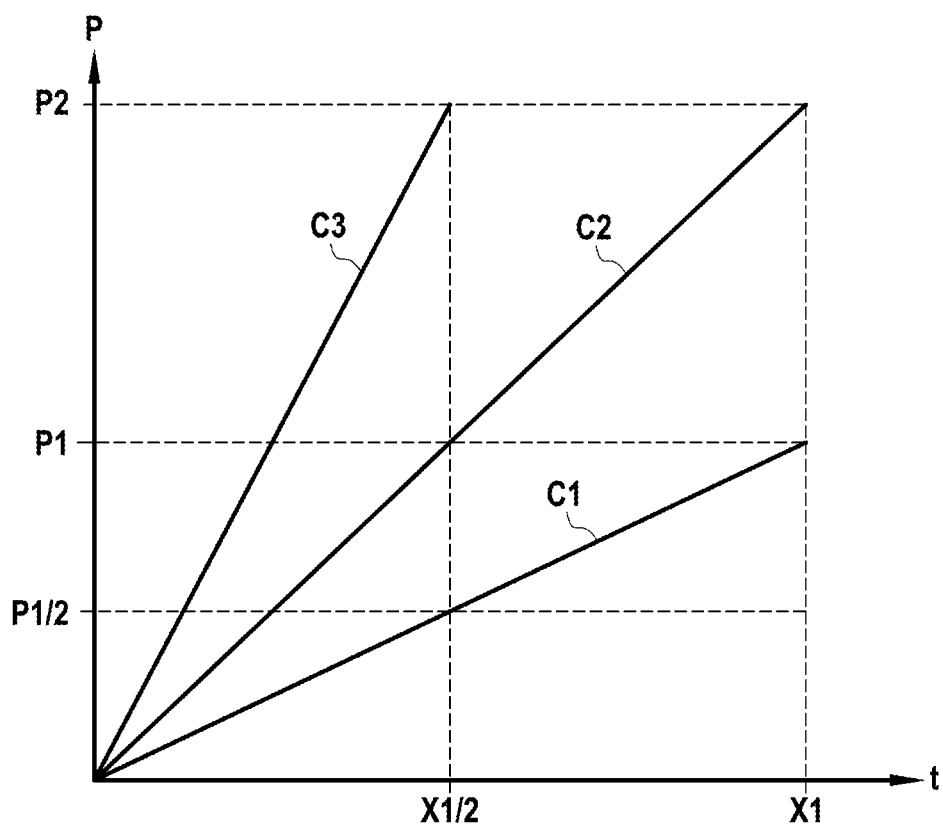
FIG. 5 is a diagram showing the action of a brake circuit as shown.

Thus, the selector connects the hydraulic actuator 58 to the third orifice 63 of the proportional solenoid valve 6, and thus enables the driven brake 3 to be braked or released in controlled manner via the electrical control 64, which is typically configured to apply control that varies as a function of a braking setpoint applied by the control circuit 200, typically as a function of the control applied by the user via the mechanical control 410 in such a manner that the main brake 2 and the driven brake 3 are synchronized as explained below with reference to FIG. 5.

The electrical control 64 is thus typically driven by a controller 130 such as an electronic control unit or "ECU" that is configured to drive the electrical control 64 as a function of the pressure at the third orifice 43 of the first braking valve 4 that is equal to the pressure at the third orifice 103 of the driver circuit 100, and also as a function of any outlet ratio applied by the hydraulic control 54. The controller 130 is thus typically associated with a pressure sensor 135 that is configured in such a manner as to measure the pressure at the third orifice 43 of the first braking valve 4.

By way of example, if it is considered that the hydraulic control 54 applies a ratio of 1, that the main brake 2 is calibrated to a maximum pressure of 60 bars and that the auxiliary brake is calibrated to a maximum pressure of 150 bars, the computer 130 drives the electrical control 64 in such a manner that the pressure at the third orifice 63 of the proportional solenoid valve 6 is equal to the pressure at the third orifice 43 of the first braking valve 4 multiplied by a ratio equal to 150/60.

If it is considered that the hydraulic control 54 applies a ratio of 5, that the main brake 2 is calibrated to a maximum pressure of 60 bars and that the auxiliary brake is calibrated to a maximum pressure of 150 bars, the computer 130 drives the electrical control 64 in such a manner that the pressure at the third orifice 63 of the proportional solenoid valve 6 is equal to the pressure at the third orifice 43 of the first braking valve 4 multiplied by a ratio equal to (150/5)/60, i.e. 30/60.

If it is considered that the hydraulic control 54 applies a ratio of 5, that the main brake 2 is calibrated to a maximum pressure of 20 bars and that the auxiliary brake is calibrated to a maximum pressure of 150 bars, the computer 130 drives the electrical control 64 in such a manner that the pressure at the third orifice 63 of the proportional solenoid valve 6 is equal to the pressure at the third orifice 43 of the first braking valve 4 multiplied by a ratio equal to (150/5)/20, i.e. 30/20.

Figure 3:
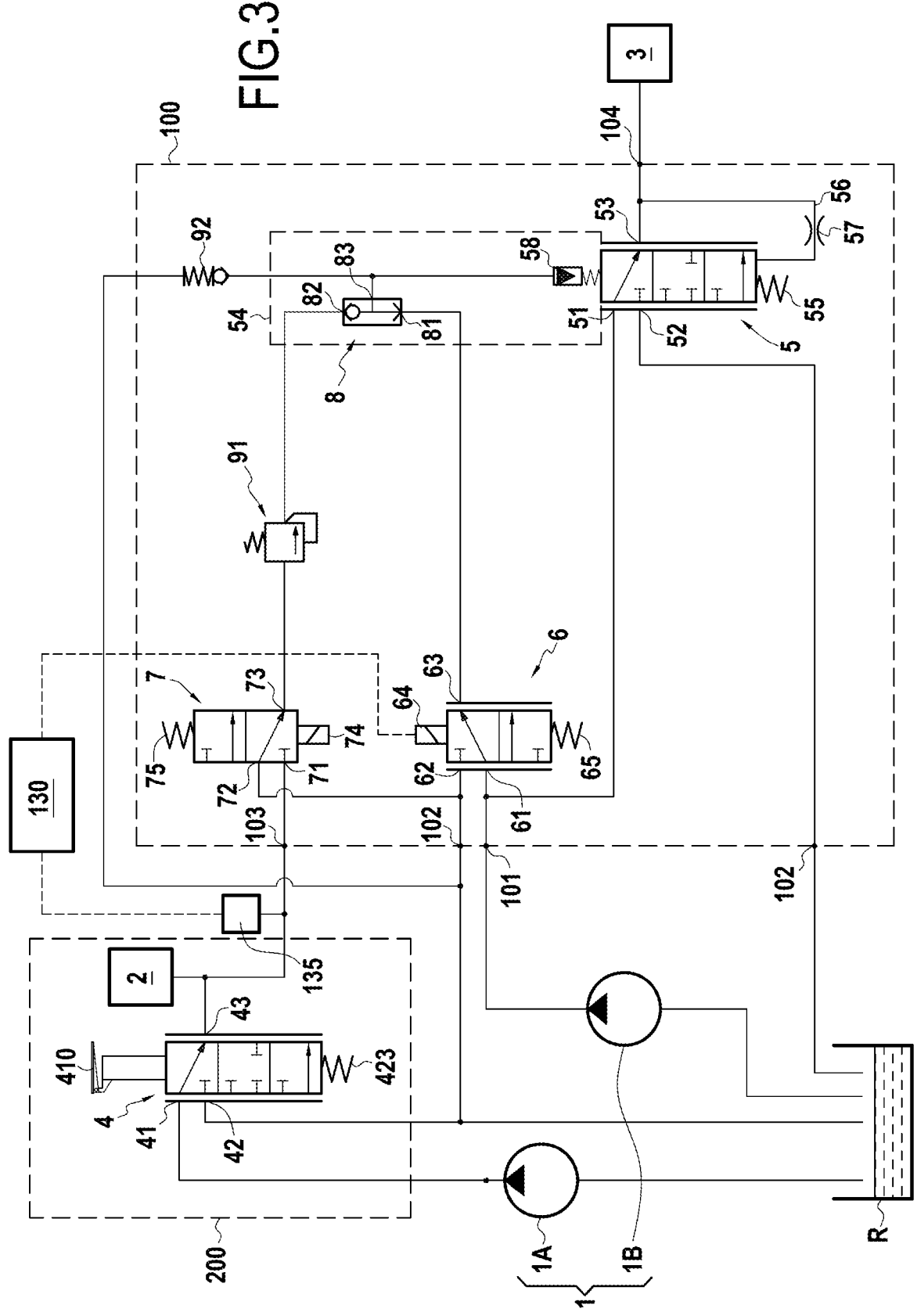
FIG. 3 shows a variant of the embodiment shown in FIG. 1.

The hydraulic control 54 is typically coupled to a pressure reducer configured in such a manner as to limit the pressure applied to the hydraulic control 54, typically interposed between the outlet orifice 83 of the high-pressure selector 8 and the hydraulic control 54, or indeed between the second admission 82 of the high-pressure selector 8 and the third orifice 73 of the solenoid directional two stable positions valve 7. Such a pressure reducer is typically calibrated to a pressure lying in the range 20 bars to 30 bars, or indeed equal to 25 bars. The hydraulic line interconnecting the outlet orifice 83 of the high-pressure selector 8 and the hydraulic control 54 may also be provided with a calibrated check valve, configured in such a manner as to discharge the fluid beyond a pressure threshold value into the reservoir R, e.g. beyond a threshold value lying in the range 25 bars to 35 bars, or indeed equal to 30 bars. Such a pressure reducer, or such a calibrated check valve, thus makes it possible to limit the pressure applied to the hydraulic control 54. FIG. 3 shows an embodiment including a pressure reducer 91 and a calibrated check valve 92 as mentioned above. Typically, the pressure reducer 91 and the calibrated check valve 92 are calibrated to a pressure substantially equivalent to the maximum drive pressure of 54 (30 bars in this example for a maximum brake pressure of 150 bars with an outlet ratio of 5).

FIG. 3 also shows a variant example in which the first braking valve 4 is connected to a first pressure source 1A, while the proportional solenoid valve 6 is connected to a second pressure source 1B. In the example shown in FIG. 1, the two pressure sources are formed by one common source. In can be well understood that operation is identical regardless of whether the pressure sources are distinct or identical, or of whether the system has one or more pressure sources.

Figure 4:
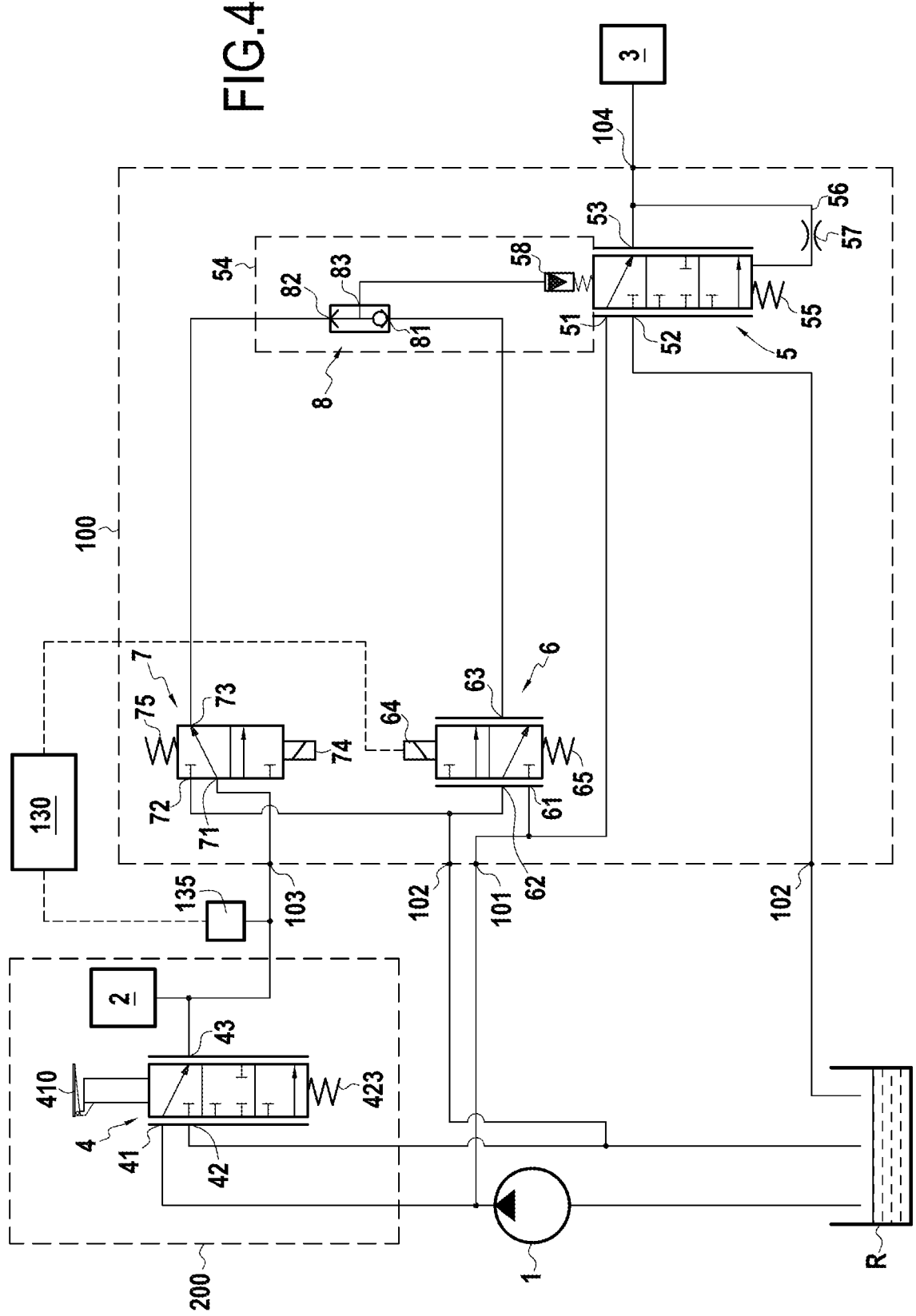
FIG. 4 shows the hydraulic brake circuit of FIG. 1 in a second configuration.

FIG. 4 shows the hydraulic braking circuit of FIG. 1 in a second configuration corresponding to "degraded" operation, in which the system is suffering from an electrical failure. It can be understood that in the event of an electrical failure, the electrical control 64 is no longer operational, which can thus be problematic for driving the driven brake 3.

FIG. 4 shows a configuration of the hydraulic brake circuit in which the electrical controls 64 and 74 are deactivated, which corresponds typically to the state of the circuit in the event of electrical failure. The proportional solenoid valve 6 and the solenoid directional two stable positions valve 7 are then switched over to their respective first configurations, due to the action of their respective return means 65 and 75.

It can thus be understood that the driven brake 3 can no longer be driven by means of the proportional solenoid valve. However, the proposed circuit makes it possible to connect the hydraulic actuator 58 of the hydraulic control 54 to the third orifice 43 of the first braking valve 4 via the solenoid directional two stable positions valve 7 in its first configuration. The high-pressure selector 8 then switches over to connect the third orifice 73 of the solenoid directional two stable positions valve 7 to the hydraulic actuator 58, insofar as the third orifice 63 of the proportional solenoid valve 6 is connected to the reservoir R.

The hydraulic actuator 58 is thus connected to the third orifice 43 of the first braking valve 4, thereby providing a control pressure for the braking valve 5 driven, in particular, by the user via the mechanical control 410.

In order to be driven, the main brake 2 may require a pressure that is higher than the drive pressure of the driven brake 3, e.g. about twice that pressure. By way of example, a tractor main brake 2 requires a pressure of about 60 bars, while a trailer driven brake 3 requires a pressure of about 150 bars. The operating mode shown in FIG. 3 thus involves the main brake 2 and the driven brake 3 not necessarily being synchronized. With a ratio of 2 between the pressure necessary for driving the main brake 2 relative to the pressure necessary for driving the driven brake 3, it can be understood that the driven brake 3 applies its maximum braking force while the mechanical control 410 is half way through its stroke, and therefore while is not exerting its maximum braking force. However, it can be understood that the aim of the degraded operating mode is to make it possible for the vehicle and its trailer to be used to a limited extent in the event of an electrical failure, with a view to finishing off work that is already in progress, before carrying out the necessary repairs or with a view to bringing the equipment to a place for repair while also preserving the possibility of braking the trailer.

FIG. 5 diagrammatically shows the braking action for braking a vehicle equipped with a trailer in "normal" mode and in "degraded" mode.

This figure is a graph showing the braking action for braking a vehicle and the associated trailer.

Curve C1 shows the braking action for braking the vehicle, i.e. the action of main brake 2, which action is, in this example, linear up to a maximum value P1 reached at a stroke X1, corresponding to the nominal pressure for exerting a maximum braking force for the vehicle in question, e.g. of the order of 60 bars.

The curve C2 shows the braking action of the driven brake 3, i.e. the brake on the trailer, under normal operating conditions, i.e. while the electrical system is operational. It can then be seen that the maximum braking pressure P2 (e.g. equal to 150 bars, via driving calibrated to 30 bars maximum via a drive ratio of 5 as described above) is reached for a stroke X1 of the mechanical control 410 when the main brake 2 is subjected to the pressure P1. The braking actions of the main brake 2 and of the driven brake 3 are thus synchronized, this synchronization being achieved, in particular, via the electrical control 64 of the proportional solenoid valve 6.

The curve C3 presents the braking action of the driven brake 3, i.e. the brake of the trailer under degraded operating conditions as described above with reference to FIG. 4. The braking pressure applied to the driven brake 3 is, in this example, also linear up to the pressure P2. However, it can be seen that this maximum braking pressure P2 is reached for a stroke X1/2 of the mechanical control 410 even though the braking pressure applied to the main brake 2 is not at its maximum. In the example shown, the maximum pressure P2 is reached for the curve C3 while the curve C1 is at a pressure P1/2. Therefore, in use, when the operator of the vehicle depresses the mechanical control 410 to obtain medium braking of the vehicle, the driven brake 3 of the associated trailer exerts maximum braking. It can thus be understood that the driven brake 3 applies maximum braking to the trailer while the main brake 2 is not applying a maximum braking force for the vehicle. The braking conditions are thus degraded relative to the normal operating mode, but a variable braking function continues to be provided for braking the trailer via the driven brake 3. More generally, the braking exerted by the driven brake 3 has a coefficient of proportionality that may differ relative to the braking setpoint delivered by the control circuit 200.

Conversely, if the main brake 2 is calibrated to a pressure lower than the maximum pressure necessary for braking the driven brake 3 (while taking into account any outlet ratio applied by the hydraulic brake 54), the driven brake 3 brakes to a lesser extent than the maximum possible braking while the main brake 2 is exerting its maximum braking. In such a situation, the braking valve 5 may then be dimensioned in such a manner as to apply an increased outlet ratio, in order to re-establish a situation in which the driven brake 3 brakes to an extent greater than the braking exerted by the main brake 2. In this situation too, it can be understood that this degraded operation remains advantageous compared with circuits in which no braking of the driven brake 3 is possible.

Figure 6:
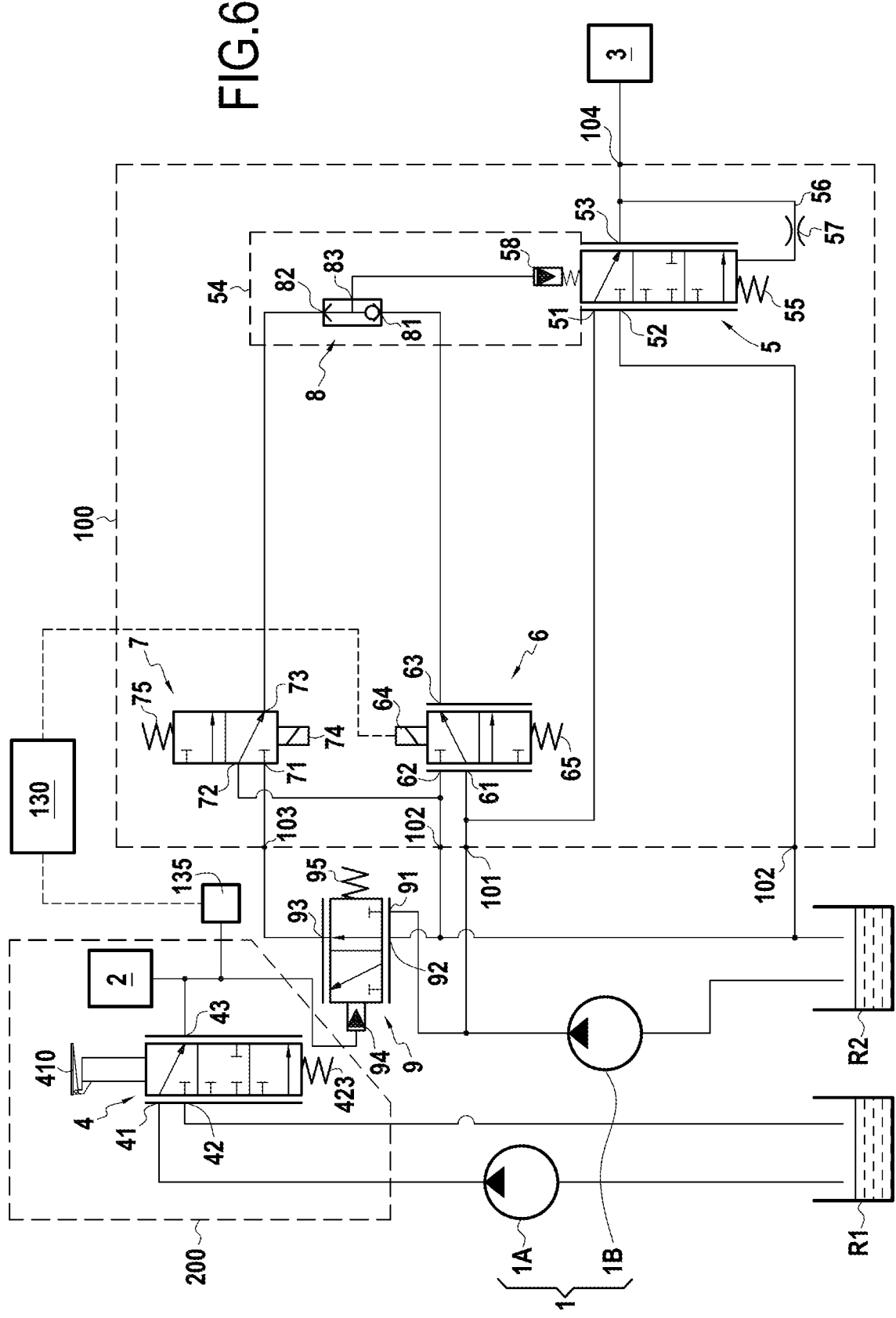
FIG. 6 shows a variant of the embodiment shown in FIG. 3.

FIG. 6 shows another variant of a system of the present invention.

This figure shows a variant of the embodiment shown in FIG. 3, and shows an embodiment in which the main brake 2 and the driven brake 3 are controlled by immiscible fluids, and must therefore be connected to distinct hydraulic circuits. In this variant, the first pressure source 1A and the second pressure source 1B are connected to respective ones of distinct reservoirs, namely a first reservoir R1 and a second reservoir R2.

The first pressure source 1A is connected to the first orifice 41 of the proportional braking valve 4 of the primary brake 2, the second orifice 42 of which is connected to the first reservoir R1. The primary brake 2 is thus actuated using a first fluid.

The driver circuit 100 is fed with pressure by the second pressure source 1B, and discharges the fluid into the second reservoir R2, thereby making it possible to define a hydraulic loop with a second fluid that is distinct from the first fluid.

Such an embodiment is applicable in particular when the braking valve 4, the primary pressure source 1A and the first reservoir R1 are replaced with a master cylinder, which then combines the functions of pressure source, of fluid reservoir, and of driving the pressure delivered to the main brake 2, and delivers a pressure proportional to a control, typically a mechanical control. Operation of a master cylinder is known, and is recalled briefly below. The master cylinder comprises a piston mounted to move in a chamber under the action of a control, typically a mechanical control similar to the mechanical control 410. The chamber is connected to a fluid reservoir via orifices that are closed off when the movement of the piston exceeds a threshold value. Once the orifices connecting the chamber to the reservoir have been closed off, the movement of the piston compresses the fluid in the chamber, so that the fluid is put under pressure and expelled from the chamber, in this example towards the main brake 2. The pressure of the fluid brought towards the main brake 2 is thus driven by the action of the control applied to the piston. Operation of the system remains unchanged compared with the operation described below.

A driving valve 9 is then added to the driver circuit 100. The driving valve 9 is a proportional valve having a first orifice 91, a second orifice 92, and a third orifice 93. The first orifice 91 is connected to the second pressure source 1B, the second orifice 92 is connected to the second reservoir R2, and the third orifice 93 is connected to the first orifice 71 of the solenoid directional two stable positions valve 7 via the third orifice 103 of the driver circuit 100. The first orifice 101 of the driver circuit 100 is connected to the second pressure source 1B, and the second orifice 102 of the driver circuit 100 is connected to the second reservoir R2.

The driving valve 9 is driven by a hydraulic control 94 that is opposed by resilient return means 95 such as a spring. The driving valve 9 is driven by the hydraulic control 94 and by the resilient return means 95 to go between a first configuration in which the first orifice 91 is closed off and the second orifice 92 is connected to the third orifice 93, and a second configuration in which the first orifice 91 is connected to the third orifice 93 and the second orifice 92 is closed off. The resilient return means 95 urge the driving valve 9 back into its first configuration, and thus into a situation in which the third orifice 103 of the driver circuit 100 is connected to the second reservoir R2. The driving valve 9 thus delivers at its third orifice 93 a pressure that is proportional to the control applied by the hydraulic control 94. The hydraulic control 94 is connected to the third orifice 43 of the proportional braking valve 4. It is thus the pressure delivered to the primary brake 2 that drives the hydraulic control 94.

The operating mode remains similar to the operation described above, except that, in this situation, it is the second pressure source 1B and not the first pressure source 1A that delivers a pressure via the third orifice 103 of the driver circuit 100. The pressure is proportional or equal to the pressure applied to the main brake 2 due to the driving valve 9, the hydraulic control 94 of which is connected to the third orifice 43 of the first proportional braking valve 4. The pressure applied to the third orifice 103 is thus proportional to the control applied via the mechanical control 410. It can thus be understood that by calibrating the hydraulic control 94 in such a manner that the pressure at the third orifice 93 of the driving valve 9 is equal to the pressure applied to the hydraulic control 94, operation is then identical to the operation described above. The third orifice 103 of the driver circuit 100 is thus no longer fed with pressure by the first pressure source 1, but the pressure that is applied to it remains driven by the proportional braking valve 4.

The valve 94 and its return means 95 may also be dimensioned to modulate the pressure at the orifice 93 in a manner identical to the electrically driven valve 6. In the event of an electrical failure, the vehicle maintains the same behavior in braking.

Such an embodiment thus makes it possible to keep separate hydraulic circuits for the main brake 2 and for the driven brake 3.

The driving valve 9 may typically be incorporated into the driver circuit 100, or be an auxiliary module that can be added to the driver circuit 100 as a function of the vehicle on which the driver circuit is mounted.

Figure 7:
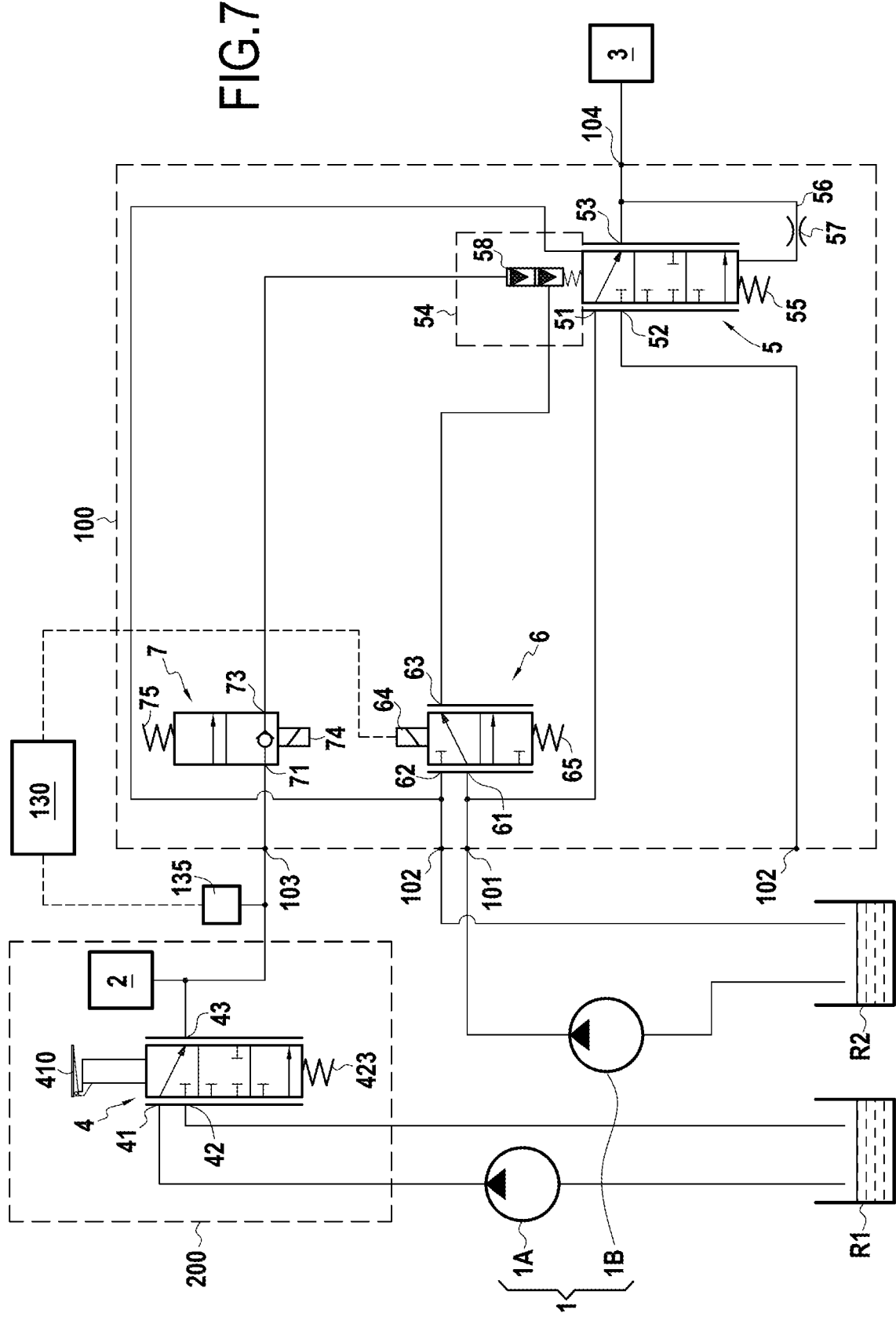
FIG. 7 shows another variant of a driver circuit of the present specification.

FIG. 7 shows another variant of a driver circuit as proposed.

In this embodiment, the hydraulic actuator 58 of the hydraulic control 54 is provided with an additional valve. The hydraulic actuator 58 thus has two pistons connected respectively to the third orifice 63 of the proportional solenoid valve 6, and to the third orifice 73 of the solenoid directional two stable positions valve 7, and the pressure of the braking valve 5 is driven by the higher of the two pressures constituted by the pressure at the third orifice 63 of proportional solenoid valve 6 and by the pressure at the third orifice 73 of the solenoid directional two stable positions valve 7.

Figure 8:
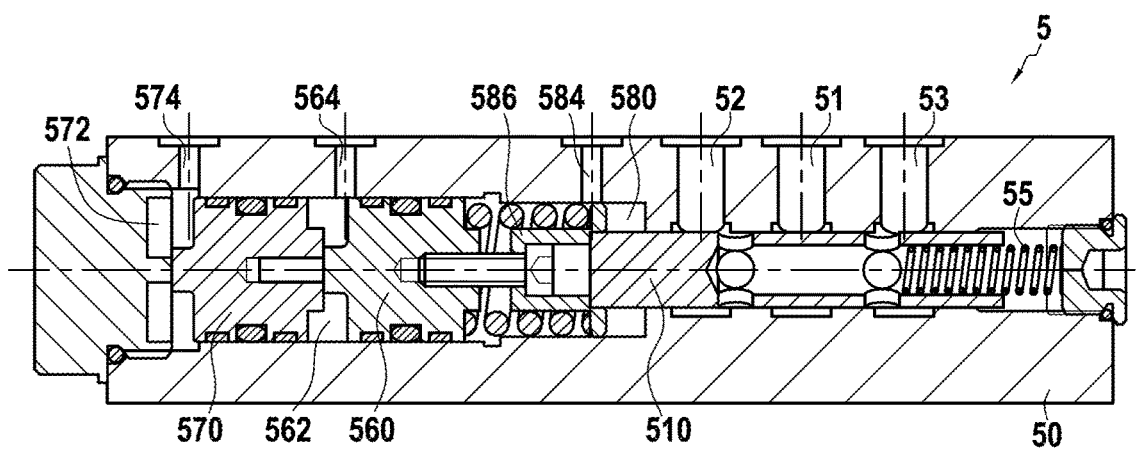
FIG. 8 shows an example of a valve used in the variant shown in FIG. 7.

FIG. 8 shows an example of a braking valve 5 that can be used in such a variant.

This figure also shows the braking valve 5 having a valve body 50, in which a selector 510 slides in such a manner as to interconnect selectively the first, second, and third orifices 51, 52, and 53. The selector 510 is moved under the action of the return means 55, which are constituted by a spring in this example, and of two pistons, namely a first piston 570 and a second piston 560, which pistons are mounted in succession in the valve body 50, and make it possible to exert on the selector 510 a thrust force opposing the force exerted by the return means 55. The valve body 50 defines a first chamber 572 connected via a third orifice 574 to the third orifice 73 of the solenoid directional two stable positions valve 7. This first chamber 572 is positioned between the first piston 570 and the valve body 50.

A second chamber 562 is also formed in the valve body 50. This second chamber 562 is formed between the first piston 570 and the second piston 560, and is connected via a second orifice 564 to the third orifice 63 of the proportional solenoid valve 6. In a variant, the first chamber 572 is connected to the third orifice 63 of the proportional solenoid valve 6, and the second chamber 562 is connected to the third orifice 73 of the solenoid directional two stable positions valve 7.

A discharge chamber 580 is also formed in the valve body 50, and is defined by the selector 510 at one end and by the second piston 580 at the other end. This discharge chamber 580 is connected via a discharge orifice 584 to the reservoir R, and includes return means 586, constituted by a spring in this example, interposed between the second piston 560 and the selector 510. This discharge chamber 580 connected to the reservoir R makes it possible to move the selector 510 in translation.

As can be seen in FIG. 8, the first chamber 572, the first piston 570, the second chamber 562, and the second piston 560 are mounted in series. Therefore, the movement of the selector 510 is driven by the higher of the two pressures constituted by the pressure inside the first chamber 572 and by the pressure inside the second chamber 562, and thus said movement is driven by the higher of the two pressures delivered by the proportional solenoid valve 6 and delivered by the solenoid directional two stable positions valve 7. Similar operation may also be obtained by mounting the first piston 570 and the second piston 560 in parallel. In this example, the first chamber 572, the first piston 570, the second chamber 562 and the second piston 560 form the hydraulic actuator 58 of the hydraulic control 54.

With reference to FIG. 7, it can also be noted that, in this embodiment, the solenoid directional two stable positions valve 7 is modified; the second orifice 72 connected to the reservoir R is omitted. The solenoid directional two stable positions valve 7 thus alternates between a first configuration in which the first orifice 71 is connected to the third orifice 73 in such a manner as to enable fluid to flow through in both directions, and a second configuration in which it is impossible for fluid to flow from the first orifice 71 to the third orifice 73 (fluid flow in the other direction remaining possible). In this example, the hydraulic control 54 is also connected to the reservoir R in such a manner as to enable fluid to be emptied.

Operation then remains unchanged compared with the operation described above with reference to the preceding figures, the function of the high-pressure selector 8 being, in this example, performed directly by the actuator of the hydraulic control 54, as described above with reference to FIG. 8, which shows a braking valve 5 that may be used for this embodiment.

This type of configuration is particularly advantageous when the two brake members use immiscible and/or incompatible oils.

FIG. 9 shows another variant of a driver circuit as proposed.

In the embodiment shown, the control circuit 200 is independent of a main vehicle brake. More generally, in this example, it is a circuit designed to deliver a pressure that is proportional to a braking setpoint.

In this example, the driver circuit 100 includes two braking valves 5a and 5b, and two proportional solenoid valves 6a and 6b in such a manner as to drive two distinct driven brakes 3a and 3b. It can be understood that this embodiment is given merely by way of illustration, and it may be generalized to driving independently any number of driven brakes. The driven brakes 3a and 3b may, for example correspond to the brakes acting on the front axle and on the rear axle of a vehicle, on two distinct wheels of a vehicle, or indeed on the powered axle of a vehicle and on the axle of a trailer associated with the vehicle. One of the auxiliary brakes may also be the main brake system of a vehicle. The control electronics make it possible, in this example, to manage the particular features of the various different braking functions depending on the conditions under which the vehicle is used and on the associated braking members. For example, it is possible to perform differential right/left braking, driving for assisting hill starts or for locking the parking brake by means of drive coming from an electronic control unit of the vehicle on the basis of input data that may, by way of non-limiting example, come from a steering wheel angle sensor, a speed at which the vehicle is advancing, an inclinometer, or more generally any sensor making it possible to obtain information relating to the conditions under which the vehicle is moving.

In this example, operation remains similar to the operation described above with reference to FIG. 6. The differences are specified below.

The main brake 2 is omitted from the control circuit 200 so that, in this example, the control circuit 200 delivers to the control circuit 100 a pressure that is proportional to a braking setpoint, applied in this example by the user by means of the mechanical control 410. In this example, it can be understood that any other control means may be suitable, provided that the function whereby a pressure proportional to a control is delivered to the driver circuit 100 is performed. Similarly, it can be understood that the main brake 2 is also optional in the diagrams shown in FIGS. 1, 3, 4, 6, and 7.

The driver circuit 100 includes two braking valves 5*a* and 5*b*, and two proportional solenoid valves 6*a* and 6*b* thus driving two driven brakes 3*a* and 3*b* via two orifices 104*a* and 104*b*. Two drive subassemblies are thus defined, the elements of which are referenced by indices a or b, each drive subassembly comprising a braking valve 5 and a proportional solenoid valve 6. These two drive subassemblies are fed in parallel via the first orifice 101 of the driver circuit 100, and each of them operates similarly to the operation described above with reference to FIGS. 1 to 7. However, it should be noted that the hydraulic controls 54*a* and 54*b* of each of the auxiliary braking valves 5*a* and 5*b* may be calibrated in distinct manners, and that the electrical controls 64*a* and 64*b* of the proportional solenoid valves 6*a* and 6*b* may be driven in distinct manners so as to drive the brakes 3*a* and 3*b* independently.

The solenoid directional two stable positions valve 7 thus makes it possible to drive each of the subassemblies in the event of electrical failure. In the example shown, this solenoid directional two stable positions valve 7 is shared in common by the two drive subassemblies, which is advantageous in particular for reasons of compactness and cost. However, it should be noted that similar operation can be obtained by adding an solenoid directional two stable positions 7 for each of the drive subassemblies.

The circuit as proposed thus makes it possible, in this example, to drive a plurality of brake systems independently while making it possible to provide braking that is proportional to a control even in the event of electrical failure. The circuit as proposed may be extended to any number of brakes, by adding, for each brake, a braking valve 5, a proportional solenoid valve 6, and an outlet orifice 104.

Although the present invention is described with reference to specific embodiments and implementations, it is clear that various modifications and changes may be made to these examples without going beyond the general scope of the invention as defined by the claims. In particular, individual characteristics of the various embodiments and implementations shown/mentioned may be combined in additional embodiments or implementations. Therefore, the description and the drawings should be considered as being given illustratively rather than restrictively.

It is also clear that all of the characteristics described with reference to a method are transposable individually or in combination to apparatus, conversely, all of the characteristics described with reference to apparatus are transposable individually or in combination to a method.

The invention claimed is:

1. A vehicle including:
   a driver circuit which comprises:
      a first orifice adapted to be connected to a pressure source, a second orifice adapted to be connected to a reservoir, a third orifice adapted to receive a pressure proportional to a braking setpoint, and a fourth orifice adapted to be connected to a driven brake, said driver circuit including:
         a proportional solenoid valve connected to the first orifice of the driver circuit;
         a solenoid directional two stable positions valve connected to the third orifice of the driver circuit; and
         a proportional braking valve provided with an actuator and configured in such a manner as to connect a driven brake selectively to a pressure source or to a reservoir;
      wherein the actuator is configured in such a manner as to be driven by the higher of the two pressures delivered by the proportional solenoid valve and delivered by the solenoid directional two stable positions valve;
   a pressure source connected to the first orifice of the driver circuit;
   a reservoir connected to the second orifice of the driver circuit;
   a driven brake connected to the fourth orifice of the driver circuit; and
   a control circuit configured in such a manner as to deliver a pressure that is proportional to a braking setpoint to the third orifice of the driver circuit, wherein the control circuit includes:
      a main brake; and
      a proportional first braking valve driving the main brake, connected to the pressure source, to the third orifice of the driver circuit and to the main brake and configured in such a manner as to deliver a pressure that is proportional to a mechanical control to the third orifice of the driver circuit and to the main brake.

2. The vehicle according to claim 1, wherein the actuator comprises a hydraulic control and a high-pressure selector that is configured in such a manner as to connect the proportional solenoid valve or the solenoid directional two stable positions valve to the hydraulic control;
   the proportional solenoid valve, the solenoid directional two stable positions valve and the selector being configured in such a manner that, in a first configuration, the hydraulic control of the braking valve is connected to the first orifice of the driver circuit via the proportional solenoid valve, and, in a second configuration, the hydraulic control of the braking valve is connected to the third orifice of the driver circuit via the solenoid directional two stable positions valve.

3. The vehicle according to claim 2, further including a pressure reducer configured in such a manner as to limit the pressure applied by the pressure source to the actuator of the braking valve via the third orifice of the driver circuit.

4. The vehicle according to claim 2, wherein:
   the braking valve has a first orifice connected to the first orifice of the driver circuit, a second orifice connected to the second orifice of the driver circuit, and a third orifice connected to the driven brake, the braking valve being driven by resilient return means that are opposed by a hydraulic control, the resilient return means urging the braking valve to be positioned in a configuration in which its first orifice is closed off, and its second orifice is connected to its third orifice; and
   the selector has a first admission, a second admission and a delivery, said delivery being connected to the hydraulic control of the braking valve, the selector being configured in such a manner as to connect the admission that has the higher pressure to the delivery;
   the proportional solenoid valve having a first orifice connected to the first orifice of the driver circuit, a second orifice connected to the second orifice of the driver circuit, and a third orifice connected to the first admission of the selector, the proportional solenoid valve being driven by resilient return means that are opposed by a hydraulic control, the resilient return means urging the proportional solenoid valve to be positioned in a configuration in which its first orifice is closed off, and its second orifice is connected to its third orifice; and the solenoid directional two stable positions valve having a first orifice connected to the third orifice of the driver circuit, a second orifice connected to the second orifice of the driver circuit, and a third orifice connected to the second admission of the selector, the solenoid directional two stable positions valve being driven by resilient return means that are opposed by a hydraulic control, the resilient return means urging the solenoid directional two stable positions valve to be positioned in a configuration in which its second orifice is closed off, and its first orifice is connected to its third orifice.

5. The vehicle according to claim 2, further including a calibrated check valve connecting the actuator of the braking valve to the second orifice of the driver circuit, said calibrated check valve being configured in such a manner as to allow fluid to pass through from the actuator of the braking valve to the second orifice of the driver circuit when the pressure applied to the actuator of the braking valve exceeds a drive threshold value.

6. The vehicle according to claim 1, wherein the actuator includes a first piston associated with a first chamber connected to the solenoid directional two stable positions valve, and a second piston associated with a second chamber connected to the proportional solenoid valve, so that the auxiliary braking valve is driven by the higher of the two pressures constituted by the pressure inside the first chamber and by the pressure inside the second chamber, and further including a pressure reducer configured in such a manner as to limit the pressure applied by the pressure source to the actuator of the braking valve via the third orifice of the driver circuit, wherein said pressure reducer is calibrated to 25 bars, the vehicle further including a pressure reducer configured in such a manner as to limit the pressure applied by the pressure source to the actuator of the braking valve via the third orifice of the driver circuit.

7. The vehicle according to claim 1, further including a calibrated check valve connecting the actuator of the braking valve to the second orifice of the driver circuit, said calibrated check valve being configured in such a manner as to allow fluid to pass through from the actuator of the braking valve to the second orifice of the driver circuit when the pressure applied to the actuator of the braking valve exceeds a drive threshold value, wherein said drive threshold value is equal to 30 bars.

8. The vehicle according to claim 1, wherein the braking valve is configured in such a manner as to deliver an outlet pressure via its third orifice, which pressure is amplified by an outlet ratio relative to the drive pressure applied to the actuator, wherein said outlet ratio lies in the range 4 to 9.

9. The vehicle according to claim 1, wherein the third orifice of the driver circuit is adapted to receive a pressure that is proportional to a pressure applied to a vehicle main brake.

10. The vehicle according to claim 1, further including a computer configured in such a manner as to control the proportional solenoid valve as a function of the pressure delivered to the main brake by the first braking valve, and further comprising a pressure sensor associated with the computer and configured to control the proportional solenoid valve as a function of the pressure delivered to the main brake by the first braking valve.

11. A vehicle including:
a driver circuit which comprises:
a first orifice adapted to be connected to a pressure source, a second orifice adapted to be connected to a reservoir, a third orifice adapted to receive a pressure proportional to a braking setpoint, and a fourth orifice adapted to be connected to a driven brake, said driver circuit including:
a proportional solenoid valve connected to the first orifice of the driver circuit;
a solenoid directional two stable positions valve connected to the third orifice of the driver circuit; and
a proportional braking valve provided with an actuator and configured in such a manner as to connect a driven brake selectively to a pressure source or to a reservoir;
wherein the actuator is configured in such a manner as to be driven by the higher of the two pressures delivered by the proportional solenoid valve and delivered by the solenoid directional two stable positions valve;
a first pressure source and a second pressure source, said second pressure source being connected to the first orifice of the driver circuit;
a first reservoir and a second reservoir, the second reservoir being connected to the second orifice of the driver circuit;
a driven brake connected to the fourth orifice of the driver circuit;
a control circuit configured in such a manner as to modulate the pressure coming from the first pressure source and to deliver said pressure to the main brake, and to deliver a pressure that is proportional to a braking setpoint to the third orifice of the driver circuit; and
a proportional driving valve connected to the second pressure source, to the second reservoir and to the third orifice of the driver circuit, and including a hydraulic control connected to the main brake, in such a manner that the pressure delivered to the third orifice by the second pressure source via the driving valve is proportional to the pressure delivered to the main brake by the first pressure source.

12. The vehicle according to claim 11, wherein the actuator comprises a hydraulic control and a high-pressure selector that is configured in such a manner as to connect the proportional solenoid valve or the solenoid directional two stable positions valve to the hydraulic control;
the proportional solenoid valve, the solenoid directional two stable positions valve and the selector being configured in such a manner that, in a first configuration, the hydraulic control of the braking valve is connected to the first orifice of the driver circuit via the proportional solenoid valve, and, in a second configuration, the hydraulic control of the braking valve is connected to the third orifice of the driver circuit via the solenoid directional two stable positions valve,
the vehicle further including a pressure reducer configured in such a manner as to limit the pressure applied by the pressure source to the actuator of the braking valve via the third orifice of the driver circuit.

13. The vehicle according to claim 12, further including a pressure reducer configured in such a manner as to limit the pressure applied by the pressure source to the actuator of the braking valve via the third orifice of the driver circuit.

14. The vehicle according to claim 12, wherein:

the braking valve has a first orifice connected to the first orifice of the driver circuit, a second orifice connected to the second orifice of the driver circuit, and a third orifice connected to the driven brake, the braking valve being driven by resilient return means that are opposed by a hydraulic control, the resilient return means urging the braking valve to be positioned in a configuration in which its first orifice is closed off, and its second orifice is connected to its third orifice; and the selector has a first admission, a second admission and a delivery, said delivery being connected to the hydraulic control of the braking valve, the selector being configured in such a manner as to connect the admission that has the higher pressure to the delivery;

the proportional solenoid valve having a first orifice connected to the first orifice of the driver circuit, a second orifice connected to the second orifice of the driver circuit, and a third orifice connected to the first admission of the selector, the proportional solenoid valve being driven by resilient return means that are opposed by a hydraulic control, the resilient return means urging the proportional solenoid valve to be positioned in a configuration in which its first orifice is closed off, and its second orifice is connected to its third orifice; and the solenoid directional two stable positions valve having a first orifice connected to the third orifice of the driver circuit, a second orifice connected to the second orifice of the driver circuit, and a third orifice connected to the second admission of the selector, the solenoid directional two stable positions valve being driven by resilient return means that are opposed by a hydraulic control, the resilient return means urging the solenoid directional two stable positions valve to be positioned in a configuration in which its second orifice is closed off, and its first orifice is connected to its third orifice.

15. The vehicle according to claim 12, further including a calibrated check valve connecting the actuator of the braking valve to the second orifice of the driver circuit, said calibrated check valve being configured in such a manner as to allow fluid to pass through from the actuator of the braking valve to the second orifice of the driver circuit when the pressure applied to the actuator of the braking valve exceeds a drive threshold value.

16. The vehicle according to claim 11, wherein the actuator includes a first piston associated with a first chamber connected to the solenoid directional two stable positions valve, and a second piston associated with a second chamber connected to the proportional solenoid valve, so that the auxiliary braking valve is driven by the higher of the two pressures constituted by the pressure inside the first chamber and by the pressure inside the second chamber, and further including a pressure reducer configured in such a manner as to limit the pressure applied by the pressure source to the actuator of the braking valve via the third orifice of the driver circuit, wherein said pressure reducer is calibrated to 25 bars, the vehicle further including a pressure reducer configured in such a manner as to limit the pressure applied by the pressure source to the actuator of the braking valve via the third orifice of the driver circuit.

17. The vehicle according to claim 11, further including a calibrated check valve connecting the actuator of the braking valve to the second orifice of the driver circuit, said calibrated check valve being configured in such a manner as to allow fluid to pass through from the actuator of the braking valve to the second orifice of the driver circuit when the pressure applied to the actuator of the braking valve exceeds a drive threshold value, wherein said drive threshold value is equal to 30 bars.

18. The vehicle according to claim 11, wherein the braking valve is configured in such a manner as to deliver an outlet pressure via its third orifice, which pressure is amplified by an outlet ratio relative to the drive pressure applied to the actuator, wherein said outlet ratio lies in the range 4 to 9.

19. The vehicle according to claim 11, wherein the third orifice of the driver circuit is adapted to receive a pressure that is proportional to a pressure applied to a vehicle main brake.

20. The vehicle according to claim 11, further including a computer configured in such a manner as to control the proportional solenoid valve as a function of the pressure delivered to the main brake by the first braking valve, and further comprising a pressure sensor associated with the computer and configured to control the proportional solenoid valve as a function of the pressure delivered to the main brake by the first braking valve.

* * * * *